United States Patent [19]
Klosterboer

[11] Patent Number: 5,931,400
[45] Date of Patent: *Aug. 3, 1999

[54] FILM CARTRIDGE AND CARTRIDGE MOUNTING INSERT FOR MICROFILM MACHINES

[76] Inventor: Donald H. Klosterboer, 846 S. Vine St., Escondido, Calif. 92025

[ * ] Notice: This patent issued on a continued prosecution application filed under 37 CFR 1.53(d), and is subject to the twenty year patent term provisions of 35 U.S.C. 154(a)(2).

[21] Appl. No.: 08/618,026

[22] Filed: Mar. 25, 1996

[51] Int. Cl.$^6$ .............................. G03B 1/04; G03B 23/02; G03B 26/06
[52] U.S. Cl. .................. 242/357; 242/348.4; 242/563.2; 242/912; 396/512
[58] Field of Search ..................................... 242/357, 348, 242/348.4, 534.2, 563.2, 912, 344; 396/512

[56] References Cited

U.S. PATENT DOCUMENTS

| | | | |
|---|---|---|---|
| 3,603,528 | 9/1971 | Kingsley et al. | 242/348.4 |
| 3,691,921 | 9/1972 | Isbell | 242/348 X |
| 4,758,851 | 7/1988 | Zeth | 354/72 |
| 4,987,300 | 1/1991 | Robertson | 250/231.14 |
| 5,003,333 | 3/1991 | Earnhart | 354/218 |
| 5,153,625 | 10/1992 | Weber | 354/173.1 |
| 5,247,323 | 9/1993 | Weber | 354/173.1 |
| 5,389,992 | 2/1995 | Weber | 354/173.1 |
| 5,659,833 | 8/1997 | FitzGerald | 242/348.4 X |

FOREIGN PATENT DOCUMENTS 356145577  11/1981  Japan ..................................... 242/357

*Primary Examiner*—John Q. Nguyen
*Attorney, Agent, or Firm*—Brown, Martin, Haller & McClain

[57] ABSTRACT

The cartridge is a generally cylindrical enclosure with a light seal through which a film web is drawn. The cartridge is closed with two side plates, one of which is removable. A spindle is journaled in the side plate. Film wound on a core is mounted on the spindle. The assembly is placed in an adapter insert. The adapter incorporates a motion multiplication mechanism such as gearing to drive a detectable element to rotate multiple times for each rotation of the core. The detectable element is positioned opposite a magnetic/proximity detector or optical detector on the host machine.

9 Claims, 3 Drawing Sheets

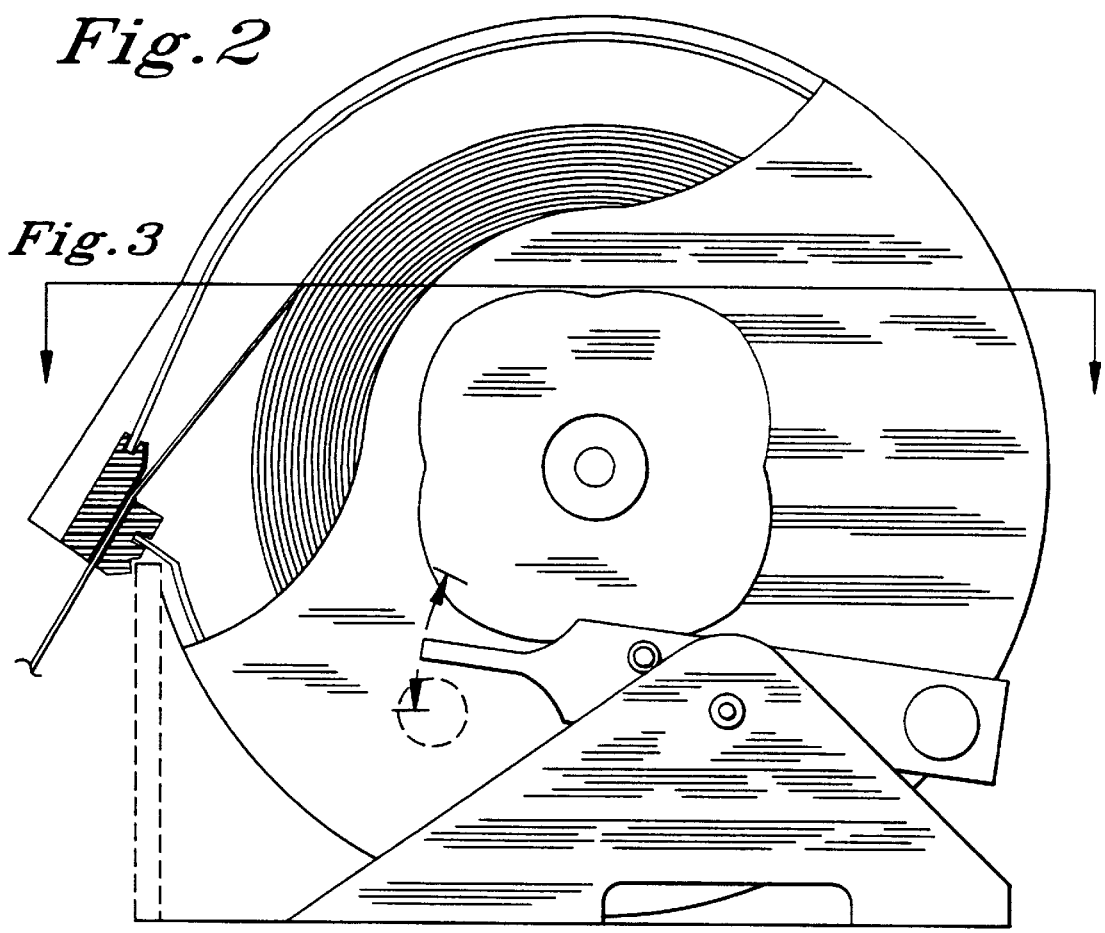
Fig.2
Fig.3
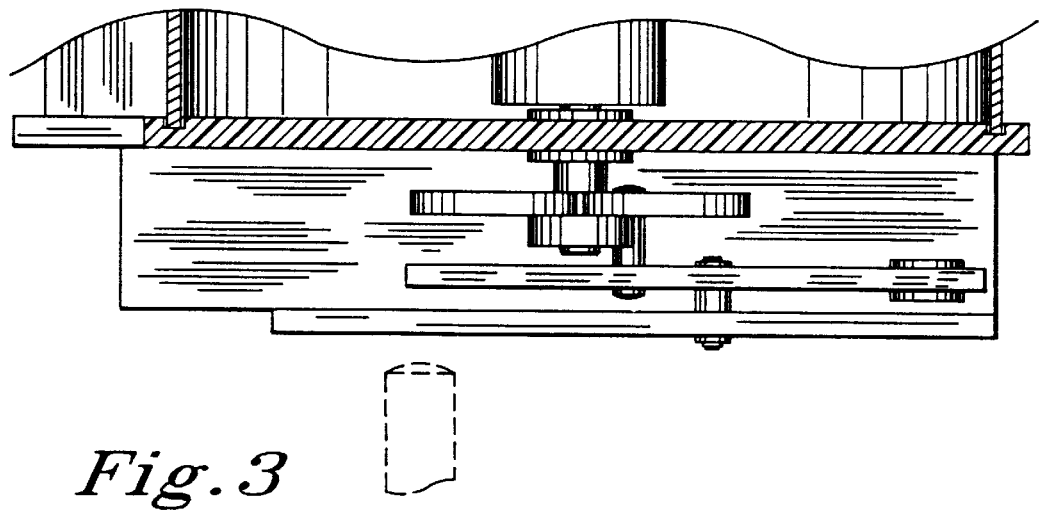
Fig.3

Fig. 4
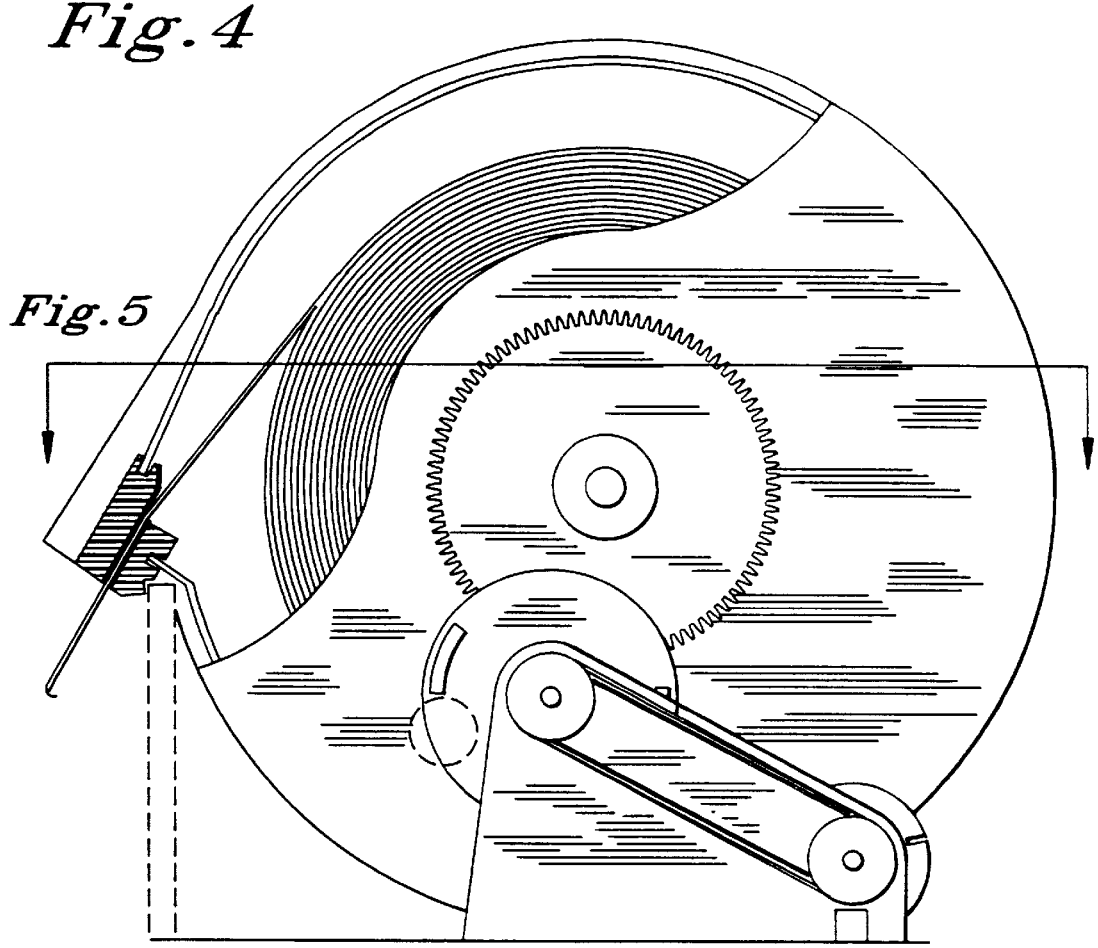
Fig. 5
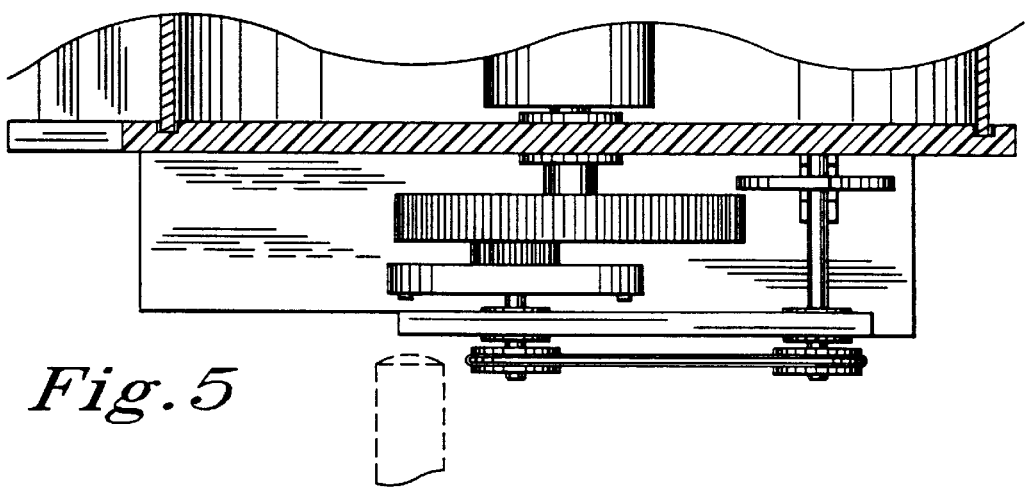
Fig. 5

FILM CARTRIDGE AND CARTRIDGE MOUNTING INSERT FOR MICROFILM MACHINES

BACKGROUND OF THE INVENTION

Computer output microfilm machines are designed to place images on microfilm webs. The webs are stored wound on cylindrical cores. The exposed film webs are then developed and used for archival and other long-term, high-durability data storage requirements. Computer Output Microfilm machines (COM recorders) are used in two modes, cut fiche or roll mode. In each mode, it is desirable for the machine to have available information on the length of unexposed film remaining in the COM recorder. This information is used to assign various length jobs to COM recorders that have sufficient remaining unused film to complete the required printing length of the job. If the COM recorder runs out of film in the middle of a job, an operator must intervene, load more film, locate where the job terminated and restart the job. This is very labor intensive and costly to system operation. It is often difficult to locate where in the data stream the job terminated. In such circumstances, it may be necessary that the film be first processed to locate the last readable image and determine where the job must be restarted. One method used to eliminate this problem is to discard short (unknown) quantities of film in a supply cassette, which is a waste of film. The loading of film in a cassette capable of supplying information of the remaining unused film is of value to the user. The determination of the remaining length of film is conventionally accomplished with a computer algorithm that calculates remaining length from the thickness of the film web, the diameter of the core on which the film is mounted, and the number of fractional rotations of the core as the film is withdrawn. Even if a job is interrupted, or a partial roll of film inserted, by the time a few new images are laid down, the algorithm can calculate how much film is left.

Conventionally film has been provided in enclosures in the form of disposable cassettes. These cassettes incorporate a split plastic housing which encloses a film core rotating on an axle journaled on bearings within the housing. The film is restrained on the core by reel flanges that extend beyond the full wound diameter of the film. Fractional rotation detection is accomplished by multiple detectable elements positioned at or near the rim of the reel flanges. These detectable elements may be magnetic or conductive discrete elements that can be remotely detected by proximity or magnetic sensors (referred to hereinafter collectively as magnetic/proximity or detectors). The detectors are positioned outside the cassette and are capable of detecting the passage of each discrete element only through the non-conductive cassette materials. In part, for this reason, such cassettes have been made of plastic materials and are not designed for re-use. In another prior art configuration, optical detectors utilize notches in the rim to generate reciprocal pivoting movement in a pivoting element. The resulting movement is connected by a complex mechanical linkage to an external shutter that alternately blocks and passes light from a light source to an externally mounted photo-diode detector. In a still further configuration, a secondary external flange may be utilized, but requires a 1 for 1 relationship between the number of detectable elements and the number of detectable events for each revolution.

The use of disposable cassettes minimizes the opportunity to recycle any part of the mechanism and substantially increases the cost of the operation of the microfilming process. Conventional cassette design also necessitates the use of a complex loading process that includes winding the film web onto a core; attaching reel flanges; loading the reel into the first half of a split cassette housing and then securing the second half of the cassette housing to the first half. All of these operations must take place in darkroom conditions to avoid exposing the film.

The two types of cassettes require two different cassette molds, cassette loading operations and film inventory systems. Also, the internal detection mechanisms create problems in determining a "failure mode" in that the cassette must be destroyed to open to see if it is operating correctly.

It is, therefore, desirable to have a mechanism for storing, dispensing and measuring a length of microfilm web in a mechanism that is simple to load, reusable, and which is adaptable to existing machines that use either magnetic/proximity or optical detection.

SUMMARY OF THE INVENTION

In exemplary embodiments of the present invention the deficiencies of prior art cassettes and sensing mechanisms are overcome with a new cartridge and film-nest insert adapter design. The inventor has discovered that the reel flanges of conventional designs may be eliminated without undesirable cork-screwing of the film. This elimination of the flanges allows a simplified cartridge design to form the enclosure for the film web. The elimination of flanges substantially reduces the cost, size and complexity of the dispensing mechanism. The elimination of the flanges also eliminates an internal mounting point for the discrete detectable elements (flange inserts or notches). This invention overcomes the apparent incompatibility with existing detectors by providing a motion multiplication mechanism mounted on the insert adapter. The insert adapter comprises a relatively inexpensive open frame structure, and can be configured so that a single insert may be used in either the magnetic/proximity type machine or in the optical type. The necessary motion transfer is accomplished through a drive disc mounted for rotation with the film core, but spaced axially from the core. The film and core are enclosed in a simple cartridge with a light seal through which the film web is drawn. The cartridge is positioned by the insert so that the feeding of film takes place in the same geometric relationship to the machine as with prior art cassettes. For each rotation of the core, the motion multiplication mechanism of the invention produces multiple detectable events to the detector. In a first embodiment, the multiplication is accomplished by utilizing a drive disc with multiple cam lobes. To achieve the necessary detectable events with a cam having as few as 4 lobes, a pivoting detectable element with is driven into pivoting reciprocation by a cam follower riding on the cam disc. By selecting the pivot point and length relationship, the detectable element is driven first downwardly past the detector and beyond the detection range and then driven upwardly past the detector and past the detection range. This action produces two events for each reciprocation cycle. As an alternative to direct mechanical linkage, an electromechanical sensor may be used to engage the cam and to alternately energize and de-energize a solenoid connected to the detectable element.

In an alternate embodiment, the drive disc engages the multiplication mechanism for rotary motion. A gear or rolling engagement may be employed. Where gearing is employed, the multiplication mechanism comprises a multiplication disc in the form of a driven gear. The drive disc is a drive gear. The effective diameter of the drive gear is an integral multiple of the driven gear. For example, in one application the device must produce eight detectable events per revolution of the core. Where the diameter of the drive gear is eight times that of the driven gear on a single detectable element is mounted for rotation with the driven gear. Alternatively, if the drive gear is four times the diameter of the driven gear, two detectable elements are provided. These elements are mounted for rotation at points diametrically opposite to one another. Conveniently, the elements may be mounted on a sensed element disc which is co-axial with the driven gear. The fore and aft position of the driven gear is selected so that the detectable elements pass the proximity/magnetic detector location in host machines employing that sensor type.

A universal insert adapter is created by producing spaced detectable events, the first being of the magnetic/proximity type and the second optical. When utilized with the gear drive embodiment described above, the necessary rotation for the optical component is obtained by a pulley which is co-axially mounted with the driven gear. At the location of the optical detection, the frame of the nest insert journals a shaft which mounts at one end a slotted disc and at the other a pulley. A belt drives the two pulleys in synchronization. Since either type of machine is accommodated with a single nest insert, manufacturing and distribution economies may be realized. A typical installation would require only one nest and two cartridges per machine (one cartridge would be in use and one available for reloading at any given time).

The cartridge comprises an enclosure for the film with a generally cylindrical housing incorporating a light seal at the film web exit point. The sensing mechanism of the insert does not operate through the housing so that a durable metal construction is possible. The housing is closed with one fixed and one removable side plate. A spindle is retained for rotation on the fixed side plate. Film is loaded using a light bag or in a dark room. The film web is supplied on a core that fits over the spindle. The film is drawn through the light seal. Then the removable side plate is attached. The assembled cartridge is then placed in the insert adapter and normal machine operation may be commenced.

The invention has the advantage of reducing both cost and complexity of manufacture. The configuration minimizes the use of non-recyclable materials. Universality of application to the two principal machine types is possible. User reloadability is facilitated. These and other advantages of the invention will be further appreciated by a reading of the following detailed description, together the drawings, in which like reference numerals refer to like parts throughout and in which:

BRIEF DESCRIPTION OF THE DRAWINGS

FIG. 2 shows the cartridge received in a nest insert which enables pivoting reciprocation of the detectable element past a magnetic/proximity detector.

FIG. 3 is a sectional view taken on the section line shown on FIG. 2.

FIG. 4 shows a cartridge received in a nest insert that is configured with a gear driven motion multiplication mechanism which directly rotates a disc with two detectable elements and indirectly rotates through belt drive, a notched disc which rotates between a light source and photo diode pair.

FIG. 5 is a sectional view taken along the section line shown in FIG. 4.

DETAILED DESCRIPTION OF THE DRAWINGS

Figure 1:
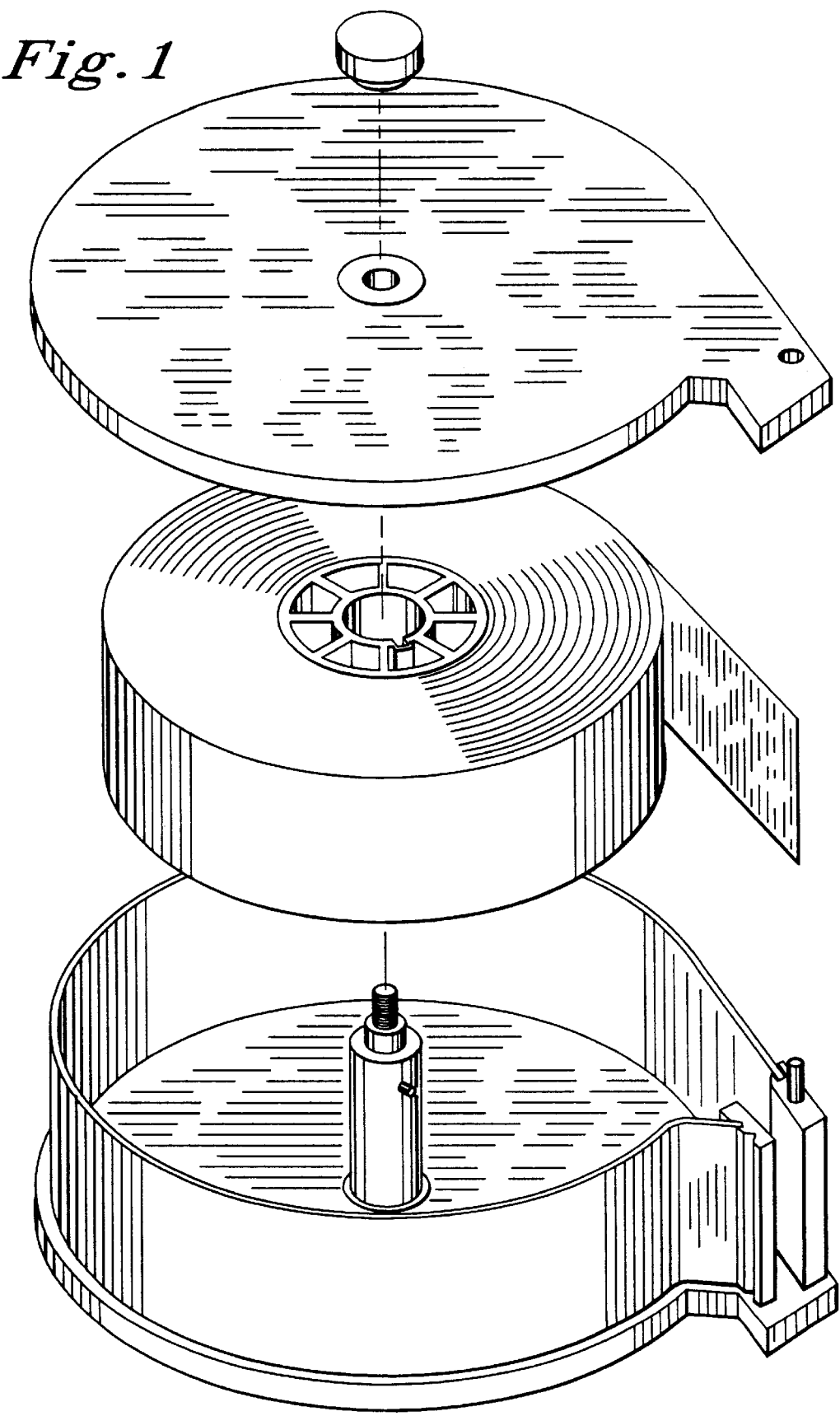
FIG. 1 is an assembly view of the cartridge according to the invention.

Referring now to the drawings, there is illustrated in FIG. 1 a cartridge 10 according to the invention. A generally cylindrical housing 12 incorporates a metal wall that is formed to accommodate a film guide 14. The film guide is shown to comprise a first film guide platen 16 which mounts an index pin 18. A second film guide platen 20 has an exterior positioning notch 22. The platens are covered with felt and light block material 17. The positioning notch cooperates with the wall to position, align and support the cartridge 10 in the host machine as will appear from the discussion of the adapter embodiments in FIGS. 2 through 6.

The housing is closed on one side by a fixed side plate 24. The fixed side plate 24 journals a spindle 26. The spindle carries a radially mounted drive pin 28. The diameter of the spindle is stepped down at both ends to form bearing surfaces 30 and further tapered to attachment bolts 32 (the bearing surface and attachment bolt are journaled in the fixed side plate 24) and therefore are not visible in FIG. 1.

A removable side plate 34 is attached to the housing 12 to complete the enclosure. The removable side plate 34 is shown to incorporate a bearing journal 36. The attachment is accomplished by registering an index hole 38 in the removable side plate 34 with the index pin 18 at the same time the attachment bolt 32 is passed through the bearing journal 36.

A film core 40 carries a film web 42 wound on the core. The core has a drive slot 44 which is engaged by the drive pin 28 on the spindle. The terminal end 46 of the film web is shown positioned to be placed between the film guide platens 16 and 20. When the removable cover is in place on the housing, it is secured in position by the cap nut 48.

Referring now to FIGS. 2 and 3, a first embodiment of the adapter insert 50 is illustrated. The adapter insert 50 incorporates an open frame 52 which has a base plate 54 sized to be accommodated in the film nest of the host machine. The film nest conventionally receives and supports a flat bottomed cassette. In some machines, indexing pins are utilized to position and retain the cassette and the pins are received by recesses in the cassette. The openness of the frame 52 allows the base plate 54 to incorporate as many openings (not shown) as may be necessary to accommodate such indexing pins. A frame element 56 is supported from the base plate. The frame 56 mounts the motion multiplication mechanism. The base plate 54 is positioned within the COM recorder by the positioning wall 58. The wall 58 is rigidly held in position by connection to the frame (not shown) of the COM recorder. Wall 58 is conventionally used to align cassettes so that film is not skewed as it is drawn from the cassette. This feature of COM recorders is used to position the cartridge 10 of the present invention to support and align the cartridge 10 through the positioning notch 22.

In the illustrated embodiment, a pivoting reciprocating arm 60 carried on a pivot bearing 62 is utilized to transport the detectable element 64 back and forth across the detector position 66 of the host machine. Each time the element 64 passes out of the range of the detector, there is a detectable event. Therefore, the arm must make four complete cycles to achieve eight detectable events per revolution of the film core. This multiplication relationship is achieved by a drive disc in the form of a four lobe 68 cam attached to the spindle by a cap nut 70. A cam follower 72 is mounted transverse to the arm 60 and engages the undersurface of the cam 68. A bias weight 79 on the end of the arm 60 opposite the detectable element 64, holds the cam follower 72 in engagement with the cam surface 78. The spindle 26 rotates when the film web 42 is withdrawn by the host machine. The cam disc 68 drives the arm 60 in pivoting reciprocation through four complete cycles per revolution.

Referring to FIGS. 4 and 5 an alternative embodiment of the multiplication mechanism is illustrated along with a supplement drive mechanism to make the adapter insert compatible with both major types of detectors (magnetic/proximity and optical). The drive disc is shown to be in the form of a drive gear 82. The drive gear 82 engages a multiplication gear. As illustrated, the diameter of the drive gear is four times that of the multiplication gear 84 so that the multiplication gear rotates four times for each rotation of the drive gear. Detectable elements 86 are mounted on a detectable element disc 88 for co-rotation with the multiplication gear 84. Mounting the detectable elements 86 on the disc 88 spaces the detectable elements from the axis of the multiplication gear so that they travel in a circular path that takes them, in sequence, in and out of the range of the detector position 90 of the host machine. The combination of 4 to 1 gearing, and two detectable elements 86, produces eight pulses for each revolution of the spindle.

Since optical detector are typically located at the opposite end of the film nest, in machines that incorporate this alternative, an offset drive axis for the detectable elements used with the optical detector is required. The optical detector is shown to be a light source-photo diode pair 94 that is received through an opening 92 in base plate 54 and comprises a detector-light source pair 94 whose elements are separated by a space 96 through which a detectable element disc 98 is rotated. The detectable element disc 98 has a pair of diametrically opposed slots 100, of which one slot 100 is visible in FIG. 4. As each slot rotates into alignment with the detector-light source pair 94, the slots 100 allow light to pass to the photo-diode of the detector. The detectable element disc 98 is carried on a shaft 102 which rotates in a journal 104. The journal is carried on the flange 56. The shaft 106 of the multiplication gear 84 and detectable element disc 88 extend beyond the flange 56. Pulleys 108 are mounted on each shaft 102 and 106. A belt 110 interconnects the pulleys 108 so that the detectable element discs 88 and 98 rotate in synchronism. Each rotation of the spindle creates four rotations of the discs and 8 detectable events so that the host machine receives 8 pulses per revolution.

What I claim as my invention is:

1. A film cartridge and a cartridge adapter insert for being received in the film nest of a microfilm machine, where the machine incorporates at least one detector, comprising:

a cartridge adapter insert comprising a frame and at least one detectable element mounted on said frame for movement in and out of the effective sensing range of a detector;

a film cartridge supported on said cartridge adapter insert and comprising a light-tight enclosure, a spindle extending through said enclosure, said spindle being rotatably mounted on said enclosure, said spindle being adapted to receive a film core within said enclosure;

a drive disc mounted on said spindle external to said enclosure for rotation with said spindle;

a motion multiplication mechanism engaging said drive disc and connected to said detectable element, said motion multiplication mechanism having means for moving said detectable element in and out of the effective sensing range of said detector an integral number of times, greater than one, for each rotation of said spindle.

2. The film cartridge and cartridge adapter insert of claim 1, wherein:

said film cartridge is removably supported by said cartridge adapter insert.

3. The cartridge and cartridge adapter insert of claim 2 wherein:

said film cartridge incorporates a light seal through which a film web, wound on said core, may be drawn;

said frame includes an upright flange which engages and positions said light seal and said cartridge to support said cartridge on said cartridge adapter insert.

4. The cartridge and insert adapter of claim 1 wherein:

said drive disc comprises a multi-lobed cam;

said motion multiplication mechanism comprises a pivotally mounted arm carrying said detectable element, a cam follower positioned on said arm and in contact with said cam, said cam follower being driven by said cam in pivoting reciprocation.

5. The cartridge and cartridge adapter of claim 1 wherein:

said motion multiplication mechanism comprises a rotatably mounted multiplication disc and at least one detectable element driven into rotation by rotation of said multiplication disc.

6. The cartridge and cartridge adapter of claim 1, further including:

at least two spaced detectable element shafts, each of said shafts being in contact with and driven in rotation by said drive disc.

7. The cartridge and cartridge adapter insert of claim 6, wherein:

One of said detectable element shafts mounts a slotted disc which is structured to alternatively pass and interrupt light directed to an optical detector as said slotted disc is rotated.

8. The cartridge and cartridge adapter of claim 7, further including:

a pulley mounted on each detectable element shaft;

a belt passing over said pulleys for driving said shafts in synchronism.

9. The cartridge and cartridge adapter of claim 1 wherein:

said drive disc comprises a drive gear;

said motion multiplication mechanism comprises a driven gear engaging said drive gear.

* * * * *